(12) United States Patent
Daoud

(10) Patent No.: US 6,512,876 B2
(45) Date of Patent: Jan. 28, 2003

(54) FIBER SPLICE TRAY

(75) Inventor: Bassel H. Daoud, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/841,832

(22) Filed: Apr. 25, 2001

(65) Prior Publication Data

US 2002/0159744 A1 Oct. 31, 2002

(51) Int. Cl.[7] .................................................. G02B 6/00
(52) U.S. Cl. ....................................... 385/135; 439/942
(58) Field of Search ................................ 385/114, 135, 385/147; 439/942

(56) References Cited

U.S. PATENT DOCUMENTS 4,101,189 A * 7/1978 Moser et al. ............... 439/942
5,754,643 A * 5/1998 Decker et al. .............. 379/399
5,944,552 A * 8/1999 Hanami ...................... 439/942

* cited by examiner

*Primary Examiner*—Javaid Nasri
(74) *Attorney, Agent, or Firm*—Hedman, Gibson & Costigan, P.C.

(57) ABSTRACT

A fiber splice tray for optical fiber splices capable of holding multiple single fiber splices, ribbon fiber splices and combinations thereof having a base, a plurality of adjacent opposed retention members extending upwardly from the base and a plurality of adjacent opposed extension members extending upwardly from the base in an area between opposed retention members. The opposed extension members are separated by a space for accepting at least a portion of a fiber ribbon splice and the retention members terminate in opposed arms for accepting a single fiber splice.

The fiber splice tray can include an opening through the base bounded by a shelf for the fiber or ribbon extending from the splice to pass, to assist in preventing the splice from coming dislodged from the retention member.

14 Claims, 4 Drawing Sheets

FIBER SPLICE TRAY

FIELD OF THE INVENTION

The present invention relates to peripherals for optical fibers and, more specifically, to a tray for holding a plurality of the same or different optical fiber splices simultaneously.

BACKGROUND OF THE INVENTION

Due to the nature of optical fibers, joining two ends requires a splice which is of significantly greater size than the fiber itself. The splices create physical conditions that can lead to damage of the fiber optic cable entering and leaving the splice. As such, devices have been designed for holding splices, thereby limiting the movement of the splice and potential damage to the fiber.

Many of the splice holders presently used are high density holders, capable of holding multiple splices. Generally, these comprise a number of adjacent vertical ribs extending upwardly from a base with spaces therebetween for the splices to be inserted. The space between the vertical extensions is determined by the thickness of the splice so that a friction fit is achieved when the splice is inserted between adjacent vertical ribs or extensions.

An additional consideration in retaining optical fiber splices is the type of fiber splice to be retained. Generally, optical fiber is available in single fiber format and a ribbon of 12 fibers connected together. The standard splice for a fiber ribbon is about 1.6" long and about 0.2" wide, shorter and wider than the standard single fiber splice, which is about 2.35" long and about 0.12" in diameter.

As such, splice holders are typically made in two different dimensions depending on whether they hold single fiber splices or ribbon splices, the distance between adjacent vertical ribs or extensions being farther apart to fit the thicker but shorter ribbon splices. Alternatively, the spaces between vertical ribs are small enough at the bottom to engage the thinner single fiber splices but the spaces increase toward the tops of the adjacent ribs to accept the thicker ribbon splices.

However, the prior art devices are limited in that they do not provide a holder that is capable of precisely holding a plurality of splices of different sizes simultaneously.

SUMMARY OF THE INVENTION

The present invention is directed to a fiber splice tray comprising a base member, a plurality of adjacent opposed retention members extending upwardly from said base member to a terminal end and a plurality of adjacent opposed extension members extending upwardly from said base member in an area between opposed retention members, said opposed extension members being separated by a space for accepting at least a portion of a fiber ribbon splice, wherein the terminal end of each of the retention members comprises opposed arms separated by a space for accepting at least a portion of a single fiber splice and further wherein the fiber ribbon passes through the area between adjacent retention members below the terminal ends of the retention members when a fiber ribbon splice is engaged by the extension members.

Preferably, at least one of adjacent extension members are defined by a wall extending greater than 180° toward the adjacent extension member. This configuration provides a contoured fit for retaining the ribbon fiber splice between the adjacent extension members. Similarly, the opposed arms have facing walls wherein at least one of the walls is greater than 180° to retain the single fiber splices between the opposed arms.

The area for passage of the fiber ribbon between adjacent retention members provides a staggered configuration of retention and extension members. This, taken together with the location of the terminal ends of the retention members being above the area where the ribbon cable passes between adjacent retention members provides for increased density of splices, i.e., the ability to hold more splices in a smaller space.

The base preferably includes openings through the tray, generally in the area outward of the retention members, bounded at least in part by a shelf which further acts to keep the fiber spice engaged in the retention member. The opening allows the optic fiber extending from the splice to pass and the fiber to rest against the lower side of the shelf, preventing upward movement of the fiber that could dislodge the splice from the retention member. The openings are not bounded entirely on all sides, preferably including a diagonal passage for the fiber to enter the opening.

BRIEF DESCRIPTION OF THE DRAWINGS

The following drawings, in which like reference characters designate like parts, are intended merely to illustrate the present invention without limiting the invention in any manner whatsoever, wherein.

DETAILED DESCRIPTION OF THE PREFERRED EMBODIMENT

Figure 1:
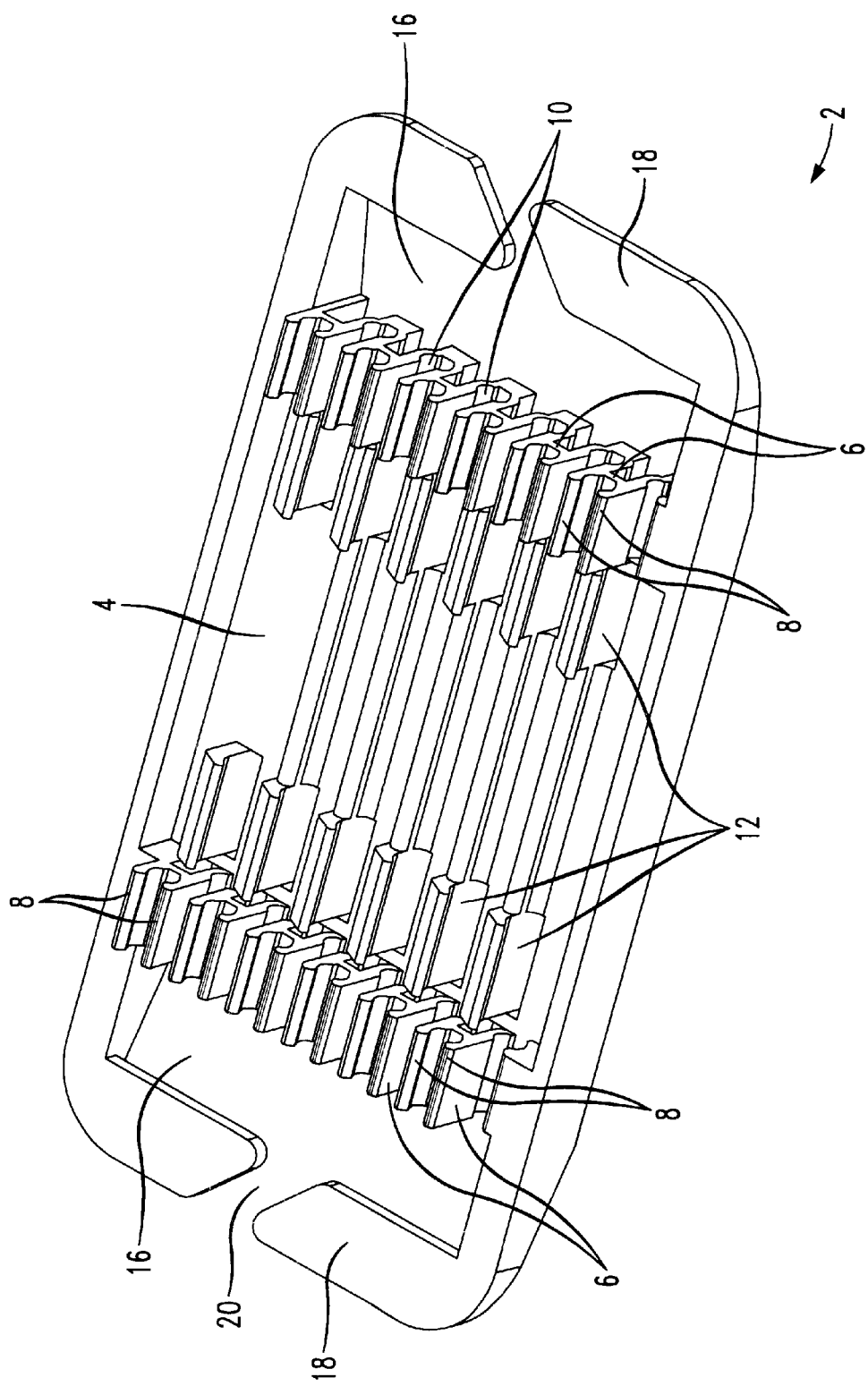
FIG. 1 is a perspective view of the preferred embodiment of the fiber splice tray of the present invention.
Figure 4:
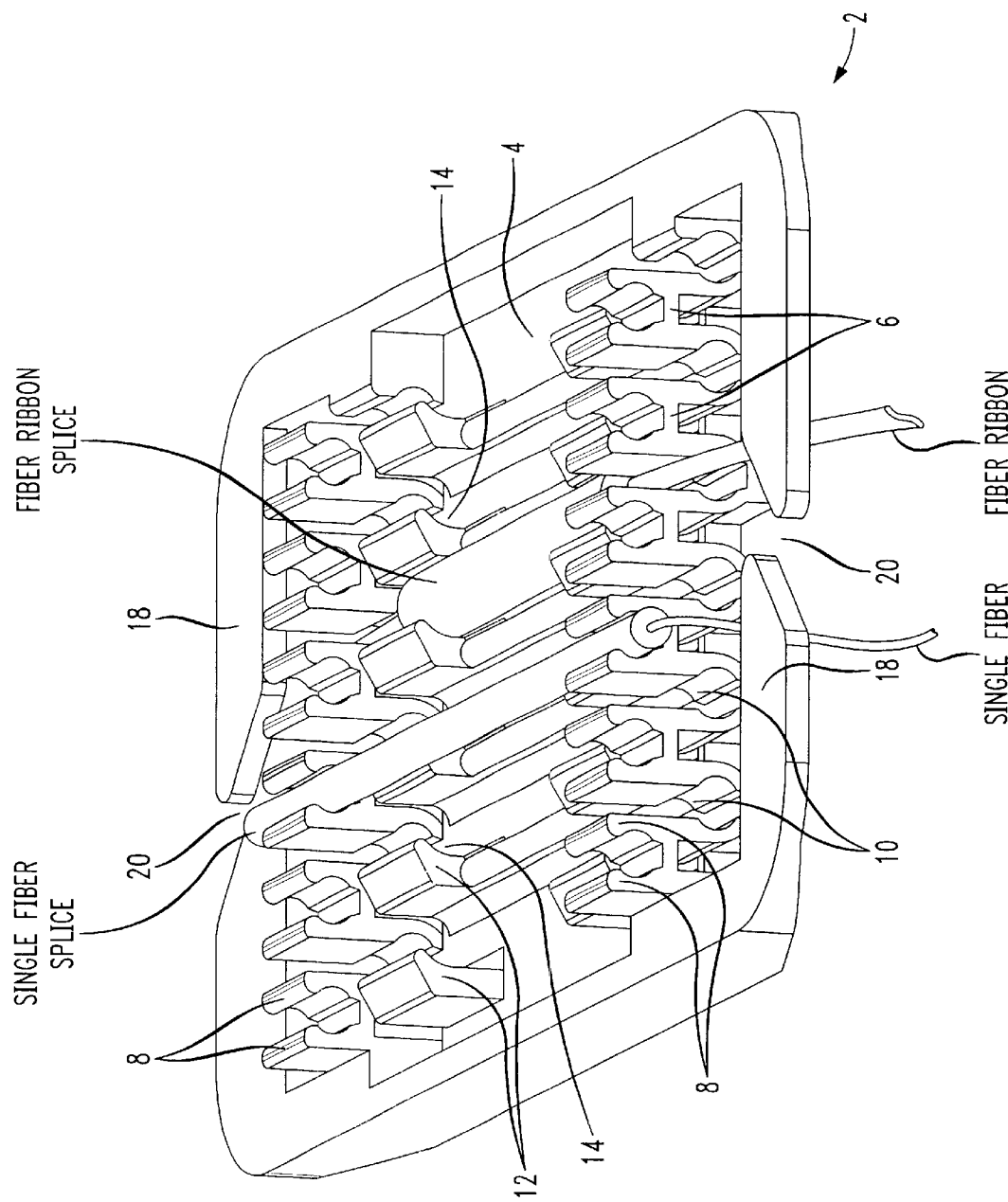
FIG. 4 is a rear perspective view of the preferred fiber splice tray of the present invention.

As shown in the FIGURES, and especially FIGS. 1 and 4, the fiber splice tray 2 of the present invention comprises a base member 4 and opposed retention members 6 projecting upwardly from said base 4 to a terminal end. The terminal ends of the retention members 6 include opposed arms 8 for holding at least a portion of a single fiber splice. Adjacent retention members 6 are separated by spaces 10 through which a fiber ribbon extending from a ribbon splice can pass.

The arms 8 at the terminal ends of the retention members 6 preferably extend more than 180° about the perimeter of a fiber splice placed in the opening between opposed arms 8 to securely capture the fiber splice. The distance between the opposed arms 8 is substantially the same as the diameter of a single fiber splice, the current standard for which is about 0.12", at the widest point. To maintain the splice in place when engaged by the opposed arms, the distance between the ends of the arms 8 is slightly smaller, due to the arms 8 at the terminal end of the retention members 6 covering more than 180° of the perimeter of the splice.

Figure 2:
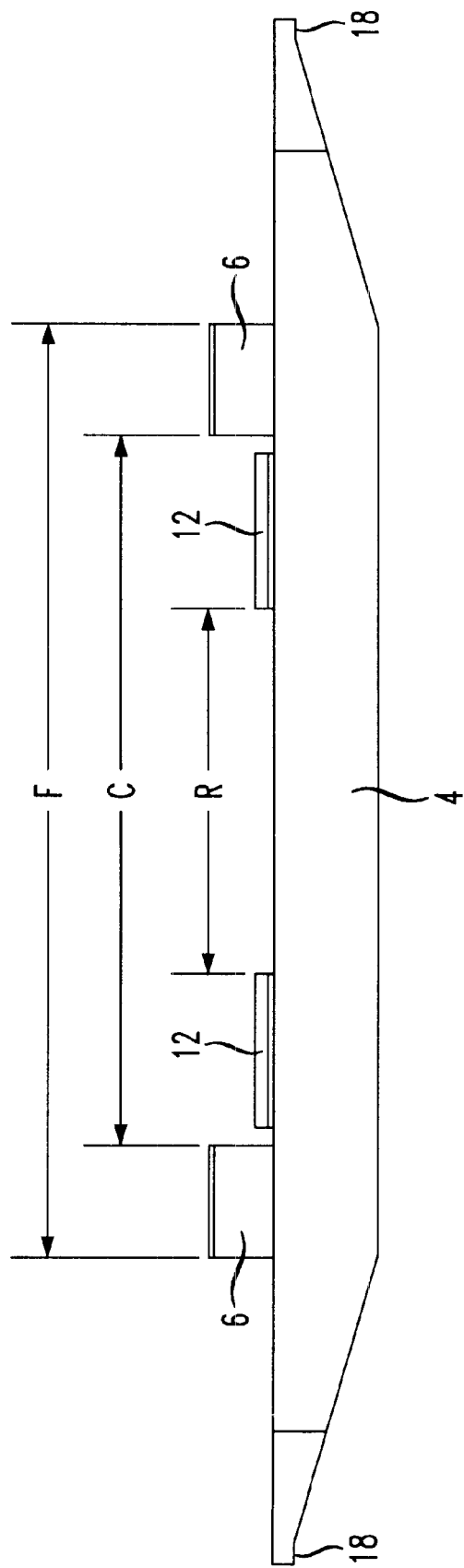
FIG. 2 is a side elevation of the preferred fiber splice tray of the present invention.

As best seen in FIG. 2, the opposed rows of retention members 6 are preferably placed on the base 4 an opposed distance F of less than about 2.35", with about 2.2" being most preferred, measured at the farthest points. The most preferred distance generally corresponds to slightly less than the length of a single fiber splice, as currently known in the art, so that the ends of the splice extend beyond the retention members 6 for user manipulation when removing the fiber splice from the retention members 6.

The present invention also includes extension members 12 located within the area between the opposed rows of retention members 6 for holding fiber ribbon splices. Most preferably, the extension members 12 are spaced slightly inward from said retention members 6 (see FIG. 3).

The extension members 12 are preferably shorter than the retention members 6 so that they do not interfere with the openings between the opposed arms 8 at the terminal ends of the retention members 6. The shorter configuration of the extension members 12 in combination with the placement of the ribbon cable between adjacent retention members 6 provides for the splices to be staggered, providing increased density for holding more splices in a smaller space.

Figure 3:
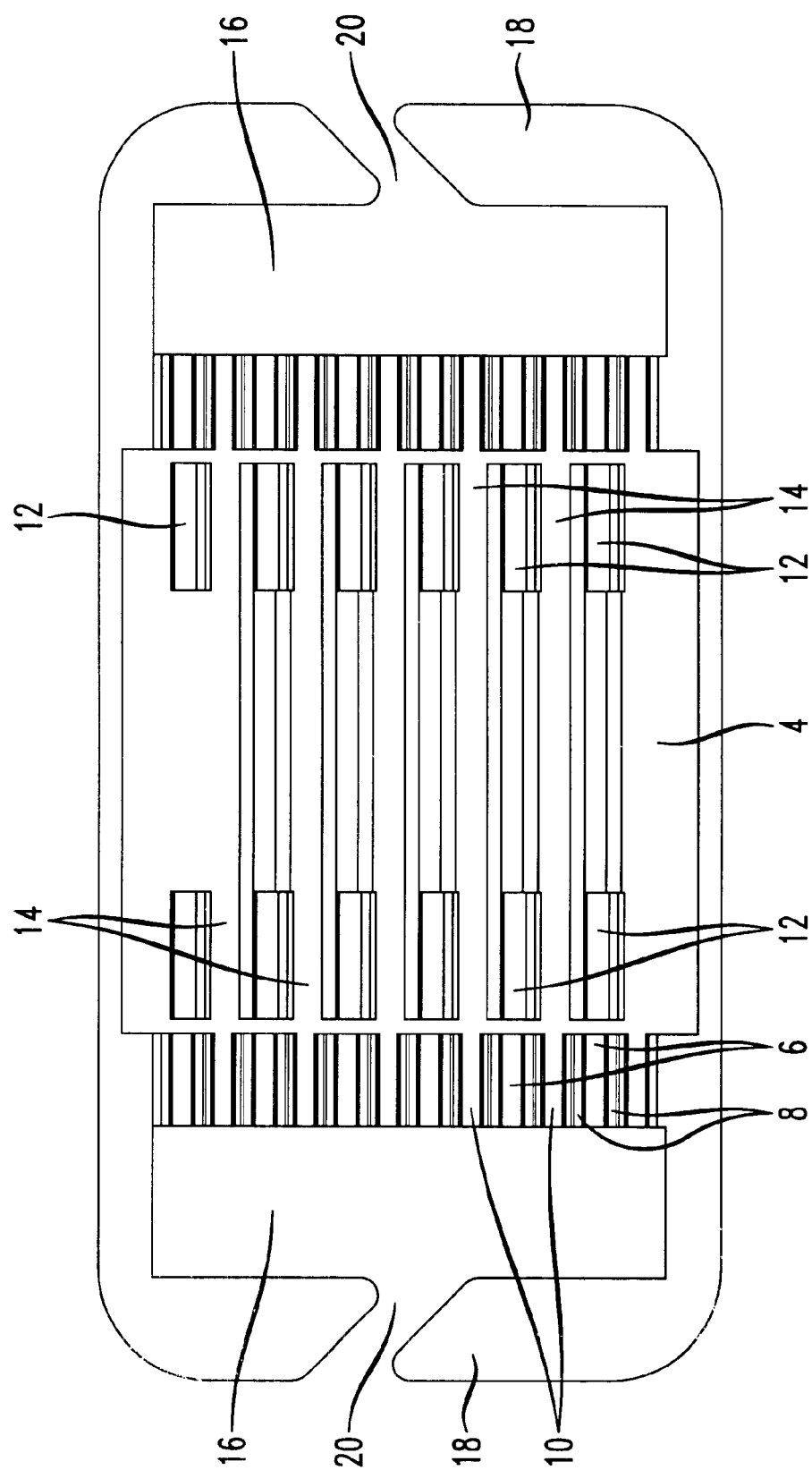
FIG. 3 is a plan view of the preferred fiber splice tray of the present invention.

The gap 14 between adjacent extension members 12 is designed for a friction fit of a ribbon fiber splice with the fiber ribbon exiting through the space 10 between adjacent retention members 6 (see FIGS. 3 and 4). Based on the current dimensions of a known ribbon splice, the gap 14 between adjacent extension members 12 is about 0.2" at the widest point to form a friction fit with the ribbon splice.

Moreover, at least one side of adjacent extension members 12 have a wall with at least a portion extending upwardly and generally inwardly toward the adjacent extension member 12, to extend more than 180° about the ribbon splice thereby maintaining the ribbon splice between the adjacent extension members 12. Most preferably, the wall having at least a portion extending upwardly and generally inwardly is partially contoured to the shape of the ribbon splice.

The extension members 12 preferably extend a distance toward the opposed extension members 12, in the area between said retention members 6, a distance sufficient so that the opposed extension members 12 securely engage at least a portion of each end of the ribbon splice. As such, as shown in FIG. 2, the distance R between the closest ends of opposed extension members 12 is preferably less than 1.6", the length of a standard ribbon splice, to provide for contact with at least the ends of the ribbon splice. In its most preferred embodiment, the distance R between the closest portions of opposed extension members 12 is about 1.4", with the closest distance C between opposed retention members 6 being about 1.6".

The structure of the present invention allows use of the same splice holder 2 to be used to hold a plurality of single fiber splices and/or a plurality of ribbon fiber splices simultaneously.

The fiber splice tray 2 also preferably includes openings 16 through the base 4, generally in the area outward of the retention members 6. The openings 16 are substantially bounded by a shelf 18 which further acts to keep the fiber spice engaged on the retention member 12. In this regard, optic fiber extending from the splice passes through the opening 16 and rests against the lower side of the shelf 18 to limit upward movement which could dislodge the fiber from the retention members 6.

In its most preferred embodiment, the shelf 18 is formed generally in horizontal relationship to the area in the middle of the retention members 6, i.e., generally below the area of the opposed arms 8 and above the area of the spaces 10 through which a ribbon fiber passes, to avoid excessive bending of the fibers, which may damage the fiber integrity. The shelf 18 thus limits upward movement of the fiber that could dislodge the splice from the retention member 6 without undue stress on the fiber.

The openings 16 are not bounded on all sides, preferably including a passage 20 in the shelf 18 for the fiber to enter the opening 16. Although the passage 20 could be anywhere along the outer perimeter of the opening 16, the far end is preferred to minimize bending of the fiber during insertion and removal. The passage 20 is preferably as small as practical to allow easy insertion and removal of the fiber to the opening 16, and is preferably formed diagonally to reduce the occurrence of the fiber slipping off of the shelf 18 and out of the opening 16.

The splice holder 2 of the present invention is preferably a unitary structure, molded from a flexible material such as rubber or polyvinyl chloride (PVC), PVC being most preferred.

Variations, alterations and modifications to the invention described herein will make themselves apparent to those skilled in the art based on the above. All such variations, alterations and modifications are intended to fall within the spirit and scope of the present invention, limited solely by the appended claims.

I claim:

1. A fiber splice tray for removable retention of single and fiber ribbon optic fiber splices comprising a base member having at least one opening in the base member through which fiber extending from the splice can pass, a plurality of adjacent opposed retention members extending upwardly from said base member to a terminal end and a plurality of adjacent opposed extension members extending upwardly from said base member in an area between opposed retention members, said opposed extension members being separated by a space for accepting at least a portion of a fiber ribbon splice, wherein the terminal end of each of the retention members comprises opposed arms separated by a space for accepting at least a potion of a single fiber splice and further wherein the fiber ribbon passes through the area between adjacent retention members below the terminal ends of the retention members when a fiber ribbon splice is engaged by the extension members.

2. The fiber splice tray of claim 1 wherein the opposed arms extend greater than 180° about a perimeter of a fiber splice.

3. The fiber splice tray of claim 1 wherein the extension members comprise at least one wall which extends upwardly and generally inwardly toward an adjacent extension member.

4. The fiber splice tray of claim 1 wherein the opposed retention members are spaced apart so that the distance between the farthest portions thereof is less than about 2.35 inches.

5. The fiber splice tray of claim 1 wherein the opposed retention members are spaced apart so that the distance between the closest portions thereof is greater than or equal to about 1.6 inches.

6. The fiber splice tray of claim 1 wherein the distance between opposed extension members is less than about 1.6 inches.

7. The fiber splice tray of claim 6 wherein the extension members are separated by a distance of about 0.2 inches at their farthest point for retaining a fiber ribbon splice.

8. The fiber splice tray of claim 1 wherein the opening is bounded at least in part by a shelf which limits upward movement of a fiber passing through the opening.

9. The fiber splice tray of claim 8 wherein the shelf comprises a passage for insertion and removal of the fiber to the opening.

10. The fiber splice tray of claim 8 wherein the shelf is formed generally adjacent to the area below space between the opposed arms for accepting at least a portion of a single fiber splice and above the area of the spaces for accepting at least a portion of the ribbon fiber.

11. The fiber splice tray of claim 1 wherein the fiber splice tray is formed of unitary construction.

12. The fiber splice tray of claim 11 wherein the fiber splice tray is made of a flexible material.

13. The fiber splice tray of claim 12 wherein the flexible material is taken from the group consisting of rubber or PVC.

14. The fiber splice tray of claim 13 wherein the flexible material is PVC.

* * * * *